(12) United States Patent
Huang

(10) Patent No.: US 9,030,642 B2
(45) Date of Patent: May 12, 2015

(54) LIQUID CRYSTAL DISPLAY DEVICE

(71) Applicant: Shenzhen China Star Optoelectronics Technology Co., Ltd., Shenzhen, Guangdong Province (CN)

(72) Inventor: Chong Huang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 230 days.

(21) Appl. No.: 13/699,729

(22) PCT Filed: Sep. 21, 2012

(86) PCT No.: PCT/CN2012/081710
§ 371 (c)(1),
(2) Date: Nov. 24, 2012

(87) PCT Pub. No.: WO2014/040308
PCT Pub. Date: Mar. 20, 2014

(65) Prior Publication Data
US 2014/0071374 A1    Mar. 13, 2014

(30) Foreign Application Priority Data

Sep. 11, 2012  (CN) .......................... 2012 1 00334437

(51) Int. Cl.
*G02F 1/1333* (2006.01)
*G02F 1/1335* (2006.01)

(52) U.S. Cl.
CPC ................................. *G02F 1/133608* (2013.01)

(58) Field of Classification Search
CPC  G02F 1/1341; G02F 1/1339; G02F 1/133351
USPC .................................................. 349/153, 187
See application file for complete search history.

(56) References Cited

U.S. PATENT DOCUMENTS 8,230,690 B1 *  7/2012  Salessi ............................ 62/3.7
2010/0007814 A1 *  1/2010  Kim ................................ 349/58

FOREIGN PATENT DOCUMENTS

| CN | 201314496 Y | 9/2009 |
| CN | 101556007 A | 10/2009 |
| CN | 101625480 A | 1/2010 |
| CN | 102315363 A | 1/2012 |
| CN | 202209594 U | 5/2012 |
| CN | 202419525 U | 9/2012 |
| KR | 10-2007-0118887 A | 12/2007 |

* cited by examiner

*Primary Examiner* — Phu Vu
(74) *Attorney, Agent, or Firm* — Cheng-Ju Chiang

(57) ABSTRACT

The present invention provides a liquid crystal display device, which includes a backlight module, a mold frame mounted on the backlight module, a liquid crystal display panel mounted on the mold frame, and a bezel mounted on the liquid crystal display panel. The backlight module includes a backplane, a light bar mounted to the backplane, a graphite pad arranged between the backplane and the light bar. The light bar includes a metal core printed circuit board that is set in the form of an inverted U-shape and a plurality of LED lights mounted to and electrically connected with the metal core printed circuit board. The metal core printed circuit board is mounted to the backplane so as to mount the light bar to the backplane.

10 Claims, 4 Drawing Sheets

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting TFT-LCDs (Thin-Film Transistor LCDs), which comprise a liquid crystal panel and a backlight module. The operation principle of the liquid crystal panel is that liquid crystal molecules are interposed between two parallel glass panels and a plurality of vertical and horizontal fine electrical wires is arranged between the two glass panels, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module arranges a light source, such as a cold cathode fluorescent lamp (CCFL) or a light-emitting diode (LED), at the back side of the liquid crystal panel to form a planar light source that directly provides lighting to the liquid crystal panel. The side-edge backlight module arranges an LED light bar of a backlight source at an edge of a backplane that is located rearward of one side of the liquid crystal panel. The LED light bar emits light that enters a light guide plate through a light incident face of the light guide plate and is projected out through a light emergence face of the light guide plate, after being reflected and diffused, to thereby transmit through an optic film assembly, after being reflected and diffused, to form a planar light source for the liquid crystal panel.

As shown in FIG. 1, a conventional liquid crystal display device comprises a backlight module 100, a mold frame 300 mounted on the backlight module 100, a liquid crystal display panel 500 mounted on the mold frame 300, and a bezel 700 mounted on the liquid crystal display panel 500. The backlight module 100 comprises: a backplane 102, a light bar 104 mounted to the backplane 102, and a reflector platec106, a light guide plate 107, and an optic film assembly 108 mounted on the backplane 102. The light bar 104 of the backlight module 100 is generally mounted to the backplane 102 by being adhered by a thermal paste 109 or being fixed by a screw (not shown). In case of abnormality or damage of the light bar 104 that requires repairing or replacing, it becomes difficult to remove and assemble for the mounting realized with adhesives or screw. This is adverse to improvement of operation efficiency.

SUMMARY OF THE INVENTION

An object of the present invention is to provide a liquid crystal display device, which makes a metal core printed circuit board of a light bar in the form of an inverted U-shape and arranges a graphite pad between the light bar and a backplane to facilitate assembling and disassembling and thus saving operation time.

To achieve the above object, the present invention provides a liquid crystal display device, which comprises a backlight module, a mold frame mounted on the backlight module, a liquid crystal display panel mounted on the mold frame, and a bezel mounted on the liquid crystal display panel. The backlight module comprises a backplane, a light bar mounted to the backplane, a graphite pad arranged between the backplane and the light bar. The light bar comprises a metal core printed circuit board that is set in the form of an inverted U-shape and a plurality of LED lights mounted to and electrically connected with the metal core printed circuit board. The metal core printed circuit board is mounted to the backplane so as to mount the light bar to the backplane.

The metal core printed circuit board comprises first and second sidewalls that are arranged to oppose each other and a third sidewall connected between the first and second sidewalls. The first sidewall and the second sidewall are arranged parallel to each other, while the third sidewall is perpendicularly connected to the first and second sidewalls. The first, second, and third sidewalls surround and delimit a U-shaped channel. The LED lights are mounted to and electrically connected to an outer surface of the first sidewall of the metal core printed circuit board.

The graphite pad is attached to an inner surface of the first sidewall of the metal core printed circuit board.

The graphite pad is arranged in a U-shaped configuration corresponding to the U-shaped channel and is set in the U-shaped channel.

The backplane comprises a bottom board and a side board connected to the bottom board. The side board and the bottom board define a receiving space.

The metal core printed circuit board is fit over and retained by the side board of the backplane with the U-shaped channel thereof.

The backlight module further comprises a reflector plate received in the receiving space, a light guide plate mounted on the reflector plate, and an optic component arranged on the light guide plate. The reflector plate is arranged on the bottom board of the backplane.

The mold frame forms a receiving section corresponding to the liquid crystal display panel, the liquid crystal display panel being received in the receiving section.

The liquid crystal display panel comprises a TFT substrate, and CF substrate laminated to the TFT substrate, liquid crystal interposed between the TFT substrate and the CF substrate, a first polarizer laminated to a surface of the TFT substrate away from the CF substrate, and a second polarizer laminated to a surface of the CF substrate away from the TFT substrate.

The liquid crystal display panel further comprises a sealant resin frame arranged along circumferential edges of the CF substrate 64 and spacers arranged inboard the sealant resin frame.

The present invention further provides a liquid crystal display device, which comprises a backlight module, a mold frame mounted on the backlight module, a liquid crystal display panel mounted on the mold frame, and a bezel mounted on the liquid crystal display panel, the backlight module comprising a backplane, a light bar mounted to the backplane, a graphite pad arranged between the backplane and the light bar, the light bar comprising a metal core printed circuit board that is set in the form of an inverted U-shape and a plurality of LED lights mounted to and electrically connected with the metal core printed circuit board, the metal core printed circuit board being mounted to the backplane so as to mount the light bar to the backplane;

wherein the metal core printed circuit board comprises first and second sidewalls that are arranged to oppose each other and a third sidewall connected between the first and second sidewalls, the first sidewall and the second sidewall being arranged parallel to each other, the third sidewall being perpendicularly connected to the first and second sidewalls, the first, second, and third sidewalls surrounding and delimiting a U-shaped channel, the LED lights being mounted to and electrically connected to an outer surface of the first sidewall of the metal core printed circuit board;

wherein the graphite pad is attached to an inner surface of the first sidewall of the metal core printed circuit board;

wherein the backplane comprises a bottom board and a side board connected to the bottom board, the side board and the bottom board defining a receiving space;

wherein the metal core printed circuit board is fit over and retained by the side board of the backplane with the U-shaped channel thereof;

wherein the backlight module further comprises a reflector plate received in the receiving space, a light guide plate mounted on the reflector plate, and an optic component arranged on the light guide plate, the reflector plate being arranged on the bottom board of the backplane;

wherein the mold frame forms a receiving section corresponding to the liquid crystal display panel, the liquid crystal display panel being received in the receiving section;

wherein the liquid crystal display panel comprises a TFT substrate, and CF substrate laminated to the TFT substrate, liquid crystal interposed between the TFT substrate and the CF substrate, a first polarizer laminated to a surface of the TFT substrate away from the CF substrate, and a second polarizer laminated to a surface of the CF substrate away from the TFT substrate; and wherein the liquid crystal display panel further comprises a sealant resin frame arranged along circumferential edges of the CF substrate 64 and spacers arranged inboard the sealant resin frame.

The efficacy of the present invention is that the present invention provides a liquid crystal display device, which uses a metal core printed circuit board that is made in an inverted U-shape to mount a light bar to a backplane and arranges a graphite pad between the light bar and the backplane to allow the graphite pad to transfer heat to the backplane for further dissipation so as to eliminate the difficult of assembling and disassembling caused by mounting the light bar with thermal paste or screwing and thus provide a simple operation of assembling and disassembling and thereby save the operation time.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

Figure 1:
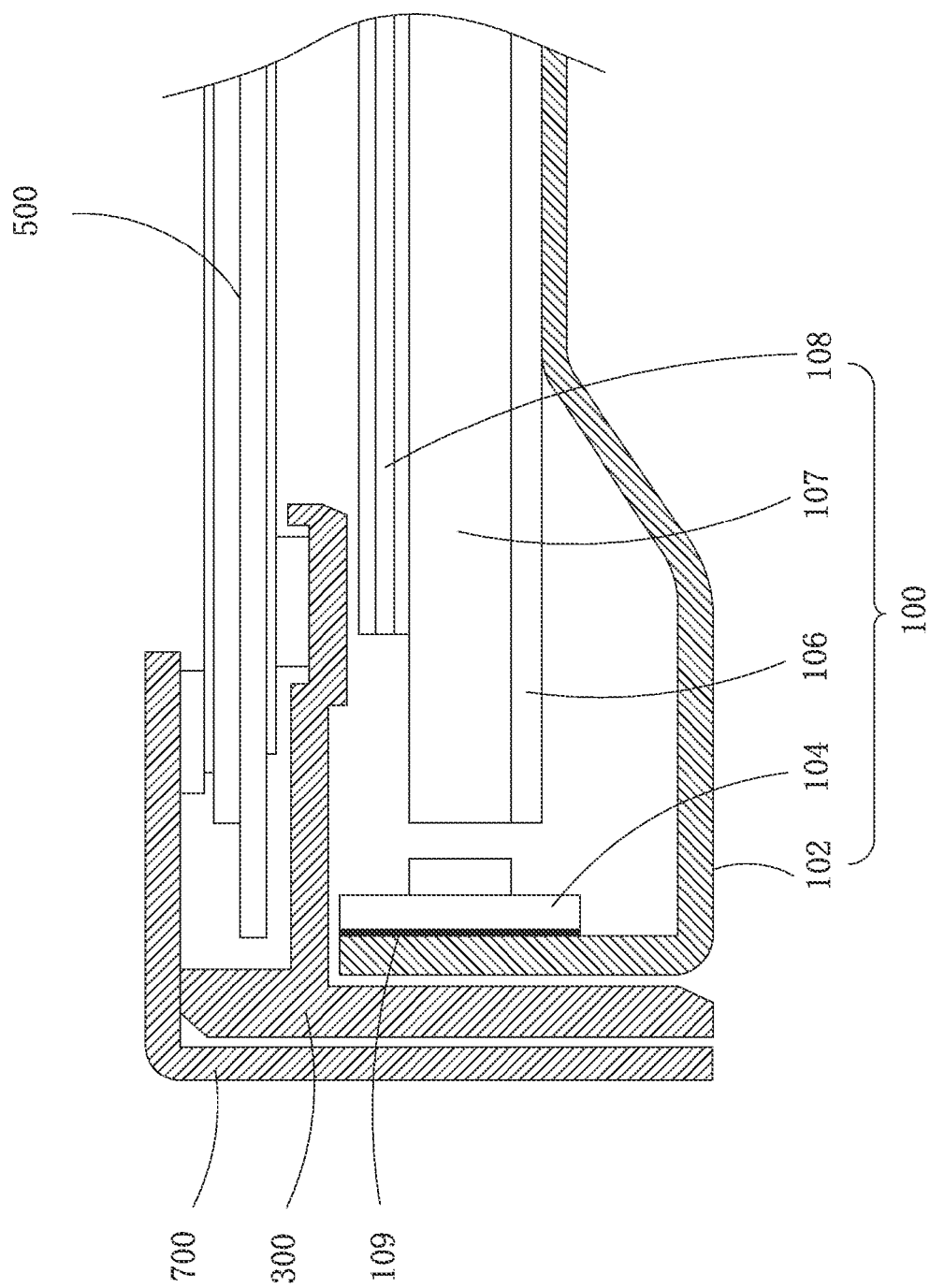
FIG. 1 is a schematic view showing the arrangement of a conventional liquid crystal display device.
Figure 2:
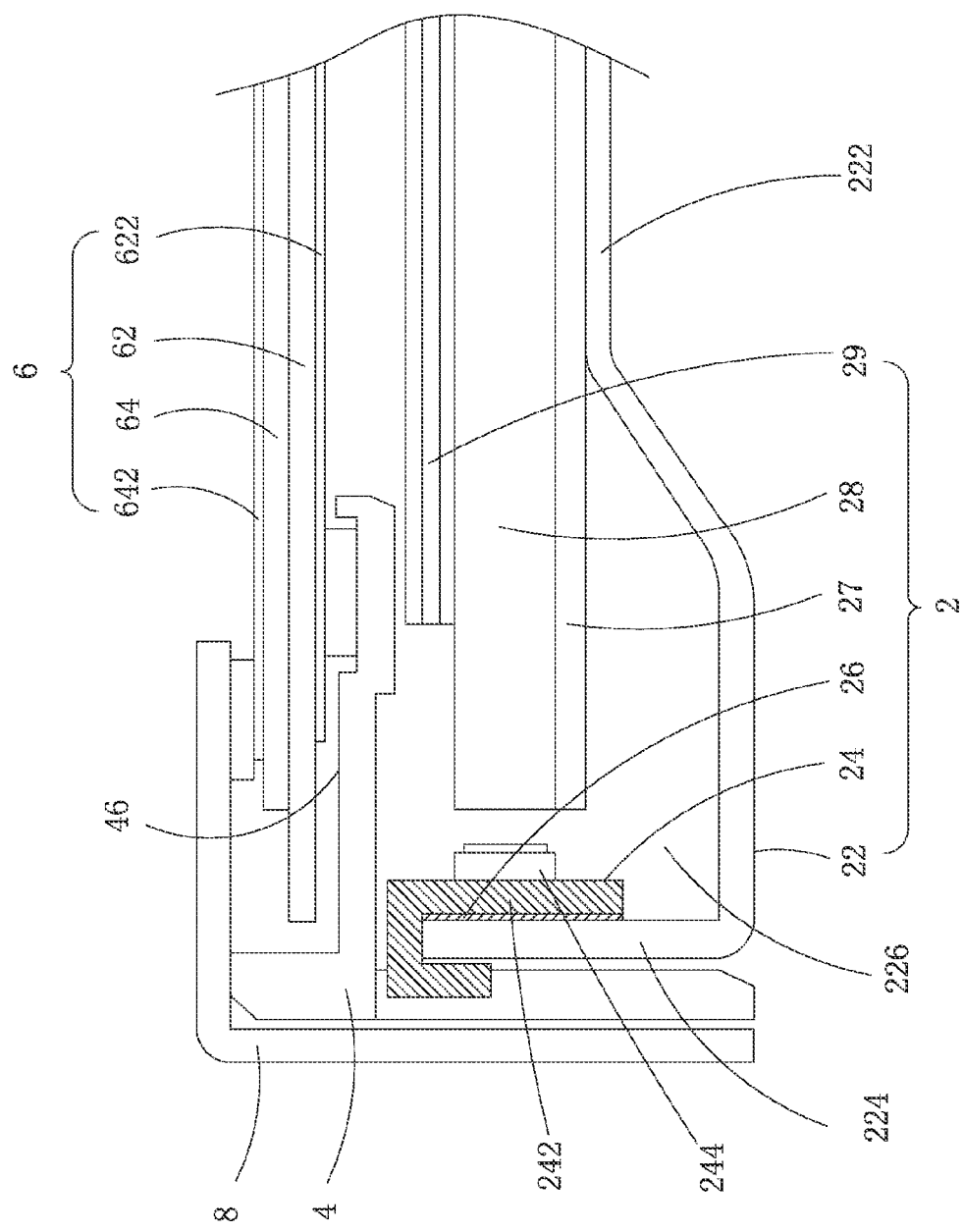
FIG. 2 is a schematic view showing the arrangement of a liquid crystal display device according to the present invention.
Figure 3:
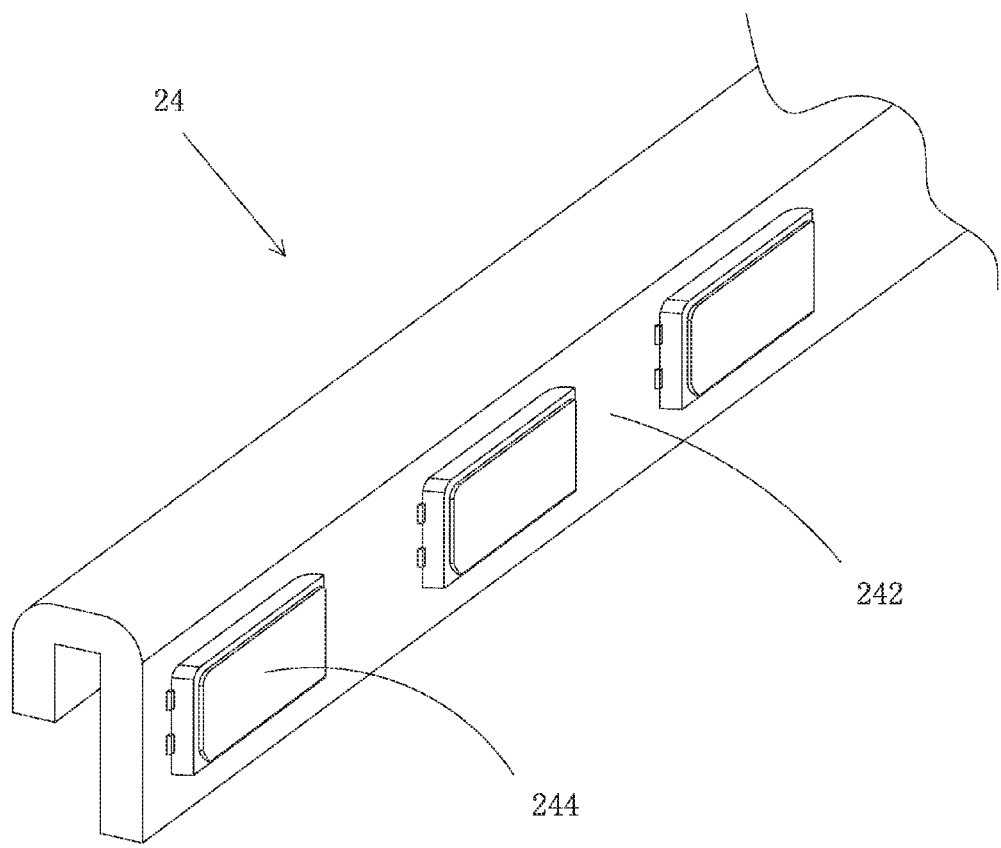
FIG. 3 is a perspective view showing a light bar of the liquid crystal display device according to the present invention.
Figure 4:
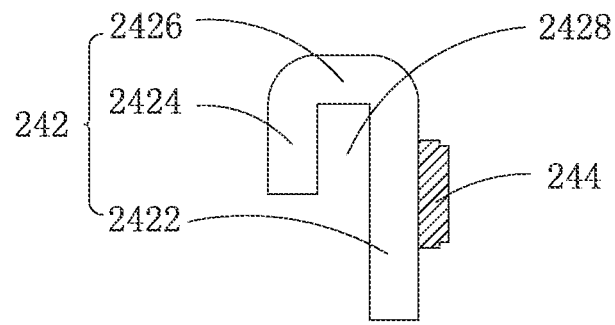
FIG. 4 is a cross-sectional view of the light bar of the liquid crystal display device according to a first embodiment of the present invention.
Figure 5:
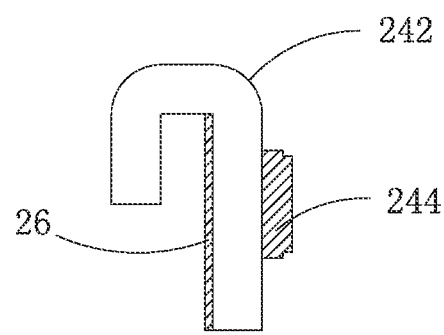
FIG. 5 is a cross-sectional view showing a graphite pad attached to the light bar of the liquid crystal display device according to a preferred embodiment of the present invention.

To further expound the technical solution adopted in the present invention and the advantages thereof, a detailed description is given to a preferred embodiment of the present invention and the attached drawings.

Referring to FIGS. 2-5, the present invention provides a liquid crystal display device, which comprises a backlight module 2, a mold frame 4 mounted on the backlight module 2, a liquid crystal display panel 6 mounted on the mold frame 4, and a bezel 8 mounted on the liquid crystal display panel 6.

The backlight module 2 comprises a backplane 22, a light bar 24 mounted to the backplane 22, a graphite pad 26 arranged between the backplane 22 and the light bar 24, a reflector plate 27 mounted on the backplane 22, a light guide plate 28 mounted on the reflector plate 27, and an optic component 29 arranged on the light guide plate 28. Light emitting from the light bar 24 is allowed to directly enter or is reflected by the reflector plate 27 to enter the light guide plate 28 and then transmits through the optic component 29 to provide a planar light source of homogeneous luminance for the liquid crystal display panel 6.

The light bar 24 comprises a metal core printed circuit board 242 that is set in the form of an inverted U-shape and a plurality of LED lights 244 mounted to and electrically connected with the metal core printed circuit board 242. The metal core printed circuit board 242 is mounted to the backplane 22 so as to mount the light bar 24 to the backplane 22. The metal core printed circuit board 242 comprises first and second sidewalls 2422, 2424 that are arranged to oppose each other and a third sidewall 2426 connected between the first and second sidewalls 2422, 2424. The first sidewall 2422 and the second sidewall 2424 are arranged parallel to each other and the third sidewall 2426 is perpendicularly connected to the first and second sidewalls 2422, 2424. The first, second, and third sidewalls 2422, 2424, 2426 surround and delimit a U-shaped channel 2428. The LED lights 244 are mounted to and electrically connected to an outer surface of the first sidewall 2422 of the metal core printed circuit board 242.

The graphite pad 26 is adhered to an inner surface of the first sidewall 2422 of the metal core printed circuit board 242. The graphite pad 26 helps transferring heat from the light bar 24 to the backplane 22 in order to dissipate off the heat and thus ensuring normal operation of the backlight module.

The backplane 22 comprises a bottom board 222 and a side board 224 connected to the bottom board 222. The side board 224 and the bottom board 222 define a receiving space 226. The reflector plate 27, the light guide plate 28, and the optic component 29 of the backlight module 2 are received in the receiving space 226. The reflector plate 27 is positioned on the bottom board 222 of the backplane 22. The metal core printed circuit board 242 is fit over and retained by the side board 224 of the backplane 22 with the U-shaped channel 2428 thereof.

The mold frame 4 forms a receiving section 46 corresponding to the liquid crystal display panel 6 and the liquid crystal display panel 6 is received in the receiving section 46. The liquid crystal display panel 6 comprises a TFT substrate 62, a CF substrate 64 laminated to the TFT substrate 62, liquid crystal (not shown) interposed between the TFT substrate 62 and the CF substrate 64, a first polarizer 622 laminated to a surface of the TFT substrate 62 that is away from the CF substrate 64, and a second polarizer 642 laminated to a surface of the CF substrate 64 that is away from the TFT substrate 62. The liquid crystal display panel 6 further comprises a sealant resin frame (not shown) arranged along circumferential edges of the CF substrate 64 and spacers arranged inboard (not shown) the sealant resin frame.

Figure 6:
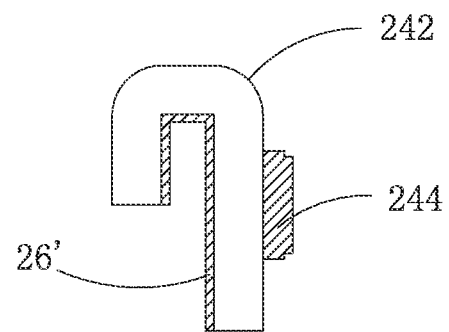
FIG. 6 is a cross-sectional view showing a graphite pad attached to the light bar of the liquid crystal display device according to another preferred embodiment of the present invention.

Referring to FIG. 6, which is a cross-sectional view showing a graphite pad attached to the light bar of the liquid crystal display device according to another preferred embodiment of the present invention, in the instant embodiment, the graphite pad 26' is arranged in a U-shaped configuration corresponding to the U-shaped channel 2428 of the metal core printed circuit board 242 and is set in the U-shaped channel 2428, by which similar result to that of the previous embodiment is achieved.

In summary, the present invention provides a liquid crystal display device, which uses a metal core printed circuit board that is made in an inverted U-shape to mount a light bar to a backplane and arranges a graphite pad between the light bar and the backplane to allow the graphite pad to transfer heat to the backplane for further dissipation so as to eliminate the difficult of assembling and disassembling caused by mounting the light bar with thermal paste or screwing and thus provide a simple operation of assembling and disassembling and thereby save the operation time Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising a backlight module, a mold frame mounted on the backlight module, a liquid crystal display panel mounted on the mold frame, and a bezel mounted on the liquid crystal display panel, the backlight module comprising a backplane, a light bar mounted to the backplane, a graphite pad arranged between the backplane and the light bar, the light bar comprising a metal core printed circuit board that is set in the form of an inverted U-shape and a plurality of light emitting diode (LED) lights mounted to and electrically connected with the metal core printed circuit board, the metal core printed circuit board being mounted to the backplane so as to mount the light bar to the backplane;
wherein the metal core printed circuit board comprises first and second sidewalls that are arranged to oppose each other and a third sidewall connected between the first and second sidewalls, the first sidewall and the second sidewall being arranged parallel to each other, the third sidewall being perpendicularly connected to the first and second sidewalls, the first, second, and third sidewalls surrounding and delimiting a U-shaped channel, the LED lights being mounted to and electrically connected to an outer surface of the first sidewall of the metal core printed circuit board.

2. The liquid crystal display device as claimed in claim 1, wherein the graphite pad is attached to an inner surface of the first sidewall of the metal core printed circuit board.

3. The liquid crystal display device as claimed in claim 1, wherein the graphite pad is arranged in a U-shaped configuration corresponding to the U-shaped channel and is set in the U-shaped channel.

4. The liquid crystal display device as claimed in claim 1, wherein the backplane comprises a bottom board and a side board connected to the bottom board, the side board and the bottom board defining a receiving space.

5. The liquid crystal display device as claimed in claim 4, wherein the metal core printed circuit board is fit over and retained by the side board of the backplane with the U-shaped channel thereof.

6. The liquid crystal display device as claimed in claim 4, wherein the backlight module further comprises a reflector plate received in the receiving space, a light guide plate mounted on the reflector plate, and an optic component arranged on the light guide plate, the reflector plate being arranged on the bottom board of the backplane.

7. The liquid crystal display device as claimed in claim 1, wherein the mold frame forms a receiving section corresponding to the liquid crystal display panel, the liquid crystal display panel being received in the receiving section.

8. The liquid crystal display device as claimed in claim 1, wherein the liquid crystal display panel comprises a thin film transistor (TFT) substrate, and color filter (CF) substrate laminated to the TFT substrate, liquid crystal interposed between the TFT substrate and the CF substrate, a first polarizer laminated to a surface of the TFT substrate away from the CF substrate, and a second polarizer laminated to a surface of the CF substrate away from the TFT substrate.

9. The liquid crystal display device as claimed in claim 8, wherein the liquid crystal display panel further comprises a sealant resin frame arranged along circumferential edges of the CF substrate and spacers arranged inboard the sealant resin frame.

10. A liquid crystal display device, comprising a backlight module, a mold frame mounted on the backlight module, a liquid crystal display panel mounted on the mold frame, and a bezel mounted on the liquid crystal display panel, the backlight module comprising a backplane, a light bar mounted to the backplane, a graphite pad arranged between the backplane and the light bar, the light bar comprising a metal core printed circuit board that is set in the form of an inverted U-shape and a plurality of light emitting diode (LED) lights mounted to and electrically connected with the metal core printed circuit board, the metal core printed circuit board being mounted to the backplane so as to mount the light bar to the backplane;
wherein the metal core printed circuit board comprises first and second sidewalls that are arranged to oppose each other and a third sidewall connected between the first and second sidewalls, the first sidewall and the second sidewall being arranged parallel to each other, the third sidewall being perpendicularly connected to the first and second sidewalls, the first, second, and third sidewalls surrounding and delimiting a U-shaped channel, the LED lights being mounted to and electrically connected to an outer surface of the first sidewall of the metal core printed circuit board;
wherein the graphite pad is attached to an inner surface of the first sidewall of the metal core printed circuit board;
wherein the backplane comprises a bottom board and a side board connected to the bottom board, the side board and the bottom board defining a receiving space;

wherein the metal core printed circuit board is fit over and retained by the side board of the backplane with the U-shaped channel thereof;

wherein the backlight module further comprises a reflector plate received in the receiving space, a light guide plate mounted on the reflector plate, and an optic component arranged on the light guide plate, the reflector plate being arranged on the bottom board of the backplane;

wherein the mold frame forms a receiving section corresponding to the liquid crystal display panel, the liquid crystal display panel being received in the receiving section;

wherein the liquid crystal display panel comprises a thin film transistor (TFT) substrate, and color filter (CF) substrate laminated to the TFT substrate, liquid crystal interposed between the TFT substrate and the CF substrate, a first polarizer laminated to a surface of the TFT substrate away from the CF substrate, and a second polarizer laminated to a surface of the CF substrate away from the TFT substrate; and wherein the liquid crystal display panel further comprises a sealant resin frame arranged along circumferential edges of the CF substrate and spacers arranged inboard the sealant resin frame.

* * * * *